United States Patent
Girstl

(10) Patent No.: US 8,394,505 B2
(45) Date of Patent: Mar. 12, 2013

(54) BUILDING AND CONSTRUCTION ELEMENT

(75) Inventor: Valentin Girstl, Brno (CZ)

(73) Assignee: Flexibuild S.R.O., Brno (CZ)

( * ) Notice: Subject to any disclaimer, the term of this patent is extended or adjusted under 35 U.S.C. 154(b) by 0 days.

(21) Appl. No.: 12/527,755

(22) PCT Filed: Feb. 13, 2008

(86) PCT No.: PCT/CZ2008/000018
§ 371 (c)(1),
(2), (4) Date: Jan. 20, 2010

(87) PCT Pub. No.: WO2008/101447
PCT Pub. Date: Aug. 28, 2008

(65) Prior Publication Data
US 2010/0143698 A1    Jun. 10, 2010

(30) Foreign Application Priority Data

Feb. 21, 2007  (CZ) .................. PUV 2007-18572

(51) Int. Cl.
*B32B 23/08*  (2006.01)

(52) U.S. Cl. ........ 428/507; 428/511; 428/532; 428/536; 428/537.5

(58) Field of Classification Search .................. 428/507, 428/511, 532, 536, 537.5
See application file for complete search history.

(56) References Cited

U.S. PATENT DOCUMENTS

| | | | | |
|---|---|---|---|---|
| 3,991,252 A | * | 11/1976 | Kolakowski et al. | 52/309.9 |
| 4,282,697 A | * | 8/1981 | Spielau et al. | 52/746.11 |
| 4,368,604 A | * | 1/1983 | Spielau et al. | 52/309.8 |
| 5,345,738 A | * | 9/1994 | Dimakis | 52/309.9 |

* cited by examiner

*Primary Examiner* — Leszek Kiliman
(74) *Attorney, Agent, or Firm* — Lowe, Hauptman, Ham & Berner, LLP

(57) ABSTRACT

For a production of building and construction elements with utilization of municipal wastes there is designed an element provided with at least one basic layer of pressed pulp of laminated foodstuff packages, covered at least at one side by a plastic sheet and having outside cover layers. The basic layer comprises particles the dimension of which is maximal 30 mm.

14 Claims, 1 Drawing Sheet

BUILDING AND CONSTRUCTION ELEMENT

RELATED APPLICATIONS

The present application is based on International Application Number PCT/CZ2008/000018, filed Feb. 13, 2008, and claims priority from Czech Republic Application Number PUV2007-18572, filed Feb. 21, 2007, the disclosures of which are hereby incorporated by reference herein in their entirety.

TECHNICAL FIELD

The invention relates to building and construction element consisting of ground material based on cellulose, especially paper.

BACKGROUND OF THE INVENTION

Laminated food packages, i.e. packages made of paper or similar mass and with walls being from at least one side covered by a waterproof sheet, made usually of plastics or aluminium or their compounds, are used for packaging liquids. Such packages are worldwide applied especially in food industry. Among many others there can be mentioned packages having a shape of a tetrahedron, known as tetra-packs, serving for selling milk, fruit juices or the like. Packages of this kind are also used for a retail sale of industrial liquids. The above mentioned laminated materials are at one side very good and suitable packaging materials, on the other side they cause a lot of problems as wastes. Such packages belong namely to non-returnable ones and sheets applied for their production limit if not completely exclude their recycling for production of new packages.

It is an object of the invention to eliminate wastes of this kind by processing them into new products of wide application.

DISCLOSURE AND OBJECT OF THE INVENTION

The foregoing aims are achieved by a building and construction element in accordance with the present invention, the element being provided with at least one basic layer of pressed pulp of laminated food packages, covered at least at one its side by a plastic sheet and having outside cover layers. Further in accordance with the present invention the basic layer comprises particles the dimension of which does not exceed 30 mm. Still further in accordance with the invention there is at least inside layer of thermally insulating material positioned between the basic payers. In a preferred embodiment the cover layer consist of paper. In another preferred embodiment the thermally insulating material consists of Styrofoam. Still further in accordance with the invention the cover layer is provided with a surface layer. In still another preferred embodiment the surface layer consists of aluminium sheet. In still another preferred embodiment the plastic sheet consists of a polyethylene sheet.

According to the preferred feature of the invention an otherwise non-useable waste is utilised for manufacturing materials for building and construction applications, the materials being both hygienic as well as health non-defective, showing no emissions of volatile matters and manifesting low absorbability. The elements allow for a wide range of applications as presented below.

BRIEF DESCRIPTION OF THE DRAWINGS

By way of examples the invention will be now described with reference to the accompanying drawing.

DESCRIPTION OF PREFERRED EMBODIMENTS

Figure 1:
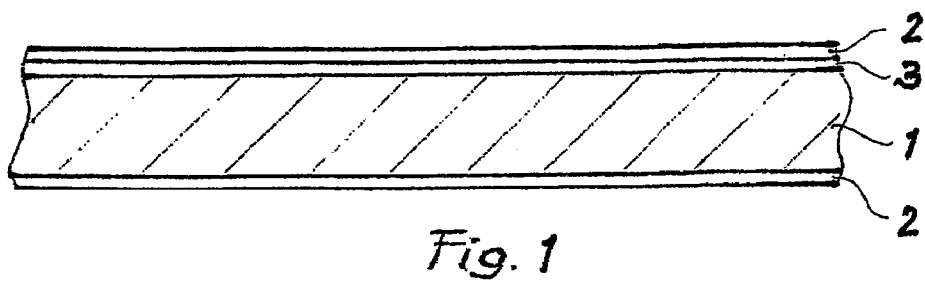
FIG. 1 schematically illustrates composition of one element in a shape of a board and FIG. 2 schematically shows a composition of a panel comprising boards build according to the invention.
Figure 2:
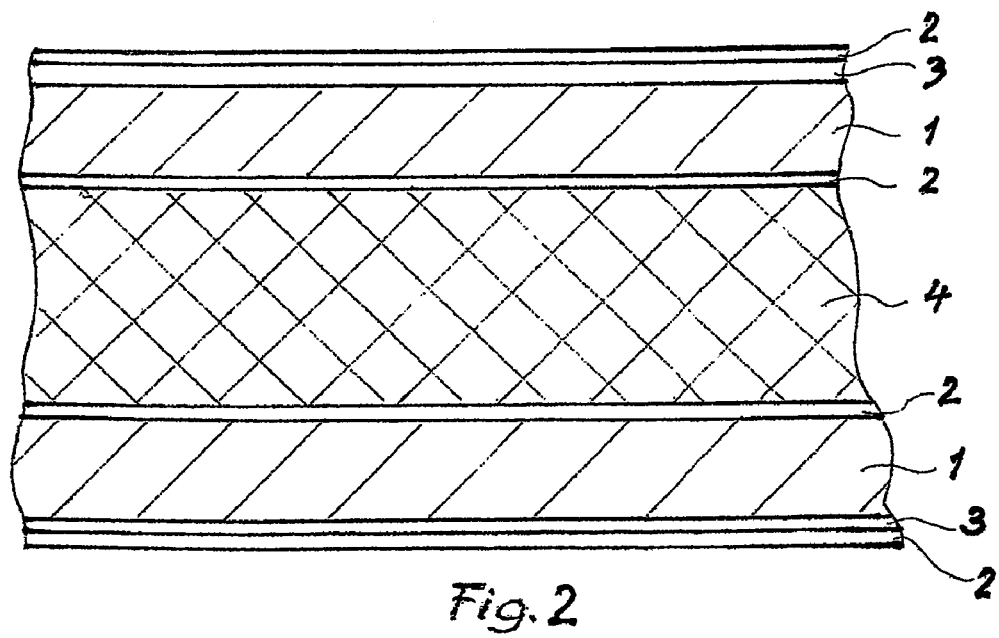

One of the most suitable initial materials are packages of the tetra-pack type. The starting raw material, empty tetra-pack packages from municipal scrap yards after removal of impurities is ground into pieces with dimensions less than 30 mm, and the ground particle are washed and dried. A basic layer 1 made of purified pulp is evenly spread on a pad made e.g. from paper, the pad being the first cover layer 2, and the layers are packed down. Consequently an empty surface of the pulp is covered by a plastic sheet 3 and a second cover layer 2 is applied. The plastic sheet 3, e.g. made of polyethylene, provides for bonding of the basic layer 1 and the cover layer 2 together. After a pressing procedure carried out at temperatures between 160 and 190° C. a cold pressing is performed. A completed board having a width of about 10 mm is consequently formatted to desired dimensions, like 2800×1200 mm.

A board manufactured as described above, covered at both sides by a paper cover sheet has a specific mass of approx. 800 kg/m3, coefficient of thermal conductivity 0.08 W/m·K, bending strength of approx. 5.5 MPa and inflammability degree C1, which means it is flammable with difficulty. The said element is non-defective from both hygienic as well as health point of view, shows no emissions of volatile matters and manifests high resistance against water cross leakage.

The building and construction element having a shape of a board is designed for interior facing. With subsequent surface finishing, e.g. by ceramic tiles or any other material like a thin plaster layer, it can be used also for exteriors. The board is also suitable for floor systems as base or cover material.

The above described basic element according the present invention having a shape of a board may be also used as a semi-product for construction and building panels of a sandwich type. Such a panel may consist of several boards, manufactured as described above, the boards being interposed with an intermediate layer 4, preferably made of insulating material. The board contact surfaces are covered with a suitable adhesive and after insertion of the insulation the aggregate as a whole is pressed together. For the purpose polystyrene (Styrofoam) boards may be applied as suitable insulating material.

As an example of such an element according to the present invention there exists a panel consisting of two above described boards. The panel has two basic layers 1, between which there is interposed one intermediate layer 4 made of polystyrene having e.g. a width of 40 mm or 100 mm. As another example there can be presented a panel consisting of five parts, the three of which are the said boards, i.e. three basic layers 1 and two polystyrene intermediate layers 4. The front surface of such a panel may be finished with a surface layer 5 such as an aluminum or plastic sheet which may be, but not necessarily comprise a decorative pattern.

Apart from waste material in a form of used packaging of the tetra-pack type, there can be used also other material of similar properties.

INDUSTRIAL APPLICATION

The present invention is intended to be used for utilization of municipal wastes and production of building and construction elements.

The invention claimed is:

1. Building and construction element comprising ground material comprising at least one basic layer of pressed pulp of laminated foodstuff packages, at least at one side of the ground material being covered by a plastic sheet and having outside cover layers.

2. Building and construction element according to claim 1, wherein the basic layer comprises particles the dimension of which is a maximum of 30 mm.

3. Building and construction element according to claim 1 wherein the at least one basic layer is two basic layers and further comprising at least one inside layer of thermally insulating material positioned between the basic layers.

4. Building and construction element according to claim 1, at least one of the outside cover layers comprising paper.

5. Building and construction element according to claim 3, the thermally insulating material comprising styrofoam.

6. Building and construction element according to claim 1, at least one of the cover layers comprising a surface layer.

7. Building and construction element according to claim 6, the surface layer comprising an aluminium sheet.

8. Building and construction element according to claim 1, the plastic sheet comprising a polyethylene sheet.

9. Building and construction element according to claim 1, the pressed pulp of laminated foodstuff packages comprising tetra-pack packaging material.

10. Building and construction element according to claim 1, the pressed pulp of laminated foodstuff packages comprising waste material comprising tetra-pack packaging material.

11. A board for building or construction use, the board comprising:
    at least one basic layer comprising ground material comprising pressed pulp of laminated foodstuff packages;
    at least one plastic sheet covering at least one side of the basic layer; and
    at least one outside cover layer covering at least one side of the basic layer.

12. The board as claimed in claim 11, the pressed pulp of laminated foodstuff packages comprising tetra-pack packaging material.

13. The board as claimed in claim 11, the pressed pulp of laminated foodstuff packages comprising waste material comprising tetra-pack packaging material.

14. The board as claimed in claim 11, the ground material comprising particles having a maximum dimension of 30 mm.

* * * * *